(12) United States Patent
Best et al.

(10) Patent No.: US 8,984,333 B2
(45) Date of Patent: Mar. 17, 2015

(54) AUTOMATIC COMPUTER STORAGE MEDIUM DIAGNOSTICS

(71) Applicant: International Business Machines Corporation, Armonk, NY (US)

(72) Inventors: Steven F. Best, Groton, MA (US); Janice M. Girouard, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 13/740,052

(22) Filed: Jan. 11, 2013

(65) Prior Publication Data

US 2014/0201566 A1 Jul. 17, 2014

(51) Int. Cl.
*G06F 11/20* (2006.01)

(52) U.S. Cl.
CPC .................................. *G06F 11/2094* (2013.01)
USPC .......................................................... 714/6.32

(58) Field of Classification Search
CPC .............. G06F 11/2094; G06F 3/0614; G06F 11/1469; G06F 11/1402; G06F 11/0751
See application file for complete search history.

(56) References Cited

U.S. PATENT DOCUMENTS

| 7,366,868 B2 * | 4/2008 | Reuter et al. ................... 711/203 |
| 7,496,796 B2 * | 2/2009 | Kubo et al. ...................... 714/42 |
| 7,743,283 B1 | 6/2010 | Taylor et al. |
| 7,984,324 B2 * | 7/2011 | Daud et al. ...................... 714/6.1 |
| 8,074,103 B2 * | 12/2011 | Dilman et al. .................. 714/6.1 |
| 8,433,947 B2 * | 4/2013 | Noguchi et al. ............... 714/6.2 |
| 2006/0053338 A1 | 3/2006 | Cousins et al. |
| 2007/0174720 A1 * | 7/2007 | Kubo et al. ..................... 714/42 |
| 2009/0106603 A1 * | 4/2009 | Dilman et al. .................. 714/42 |
| 2013/0036327 A1 * | 2/2013 | Flynn et al. .................... 714/6.3 |

OTHER PUBLICATIONS

Hewlett Packard, When Good Disks Go Bad: Dealing with Disk Failures under LVM, Oct. 2008, Hewlett Packard.

* cited by examiner

*Primary Examiner* — Nadeem Iqbal
(74) *Attorney, Agent, or Firm* — Shimokaji & Associates, P.C.

(57) ABSTRACT

An approach to providing diagnostics of data storage medium units may be performed automatically without interruption to system operations. Upon receipt of one or more error messages occurring on a first data storage medium unit, data content from the first data storage medium unit may be copied to a second data storage medium unit. A system may operate using the second data storage medium unit while the first data storage medium unit is diagnosed for possible disk failure.

17 Claims, 3 Drawing Sheets

AUTOMATIC COMPUTER STORAGE MEDIUM DIAGNOSTICS

BACKGROUND

The present invention relates to data management, and more specifically, to automatic computer storage medium diagnostics.

Operating errors in storage products typically lead to downtime. For example, a storage product may be taken offline in order to troubleshoot errors or perform error checking in general. In some cases, a system may ignore the source of error yet may slow down because the source of error may affect operating efficiency. For example, hard disks may be subject to errors which can have several causes. Some key sources of error include for example, hardware (physical disk or adapter) failures, an unsupported disk model or firmware level errors, operating system failures, or erroneous storage application code. Sometimes a disk will issue 'alerts' that a single sector was taken offline and data may be written to another sector on the same disk. In other cases, the disk may have time-out values that are inappropriate for operation of the disk. Disk alerts may yet arise even though the alerts indicate 'normal' activity for a disk. If a disk is identified as having failed an operation with each alert, then the storage product may be unusable or subject to constant physical maintenance by live personnel.

In conventional troubleshooting of storage products, the customer may perform a series of manual steps to diagnosis which part of the storage product has the error. Sometimes the hardware is at fault and other times it may be that the software is the root cause for the issue. To diagnose the problem, a user typically manually takes a device, such as a hard disk offline and runs diagnostics to determine the root cause. In some cases, multiple sources of error may be interlinked. Identification of the root cause may entail figuring out whether the hardware is affecting the software or vice versa. Once the device is offline, the diagnostics may be run until some resolution is achieved and then the user must manually reactivate their device. Manual intervention may mean that low level alerts may not necessarily be used to run extensive diagnostics, even though the customer has plenty of bandwidth to disable the device and execute diagnostics. To do so may be too disruptive to the end user. Thus user confidence in their storage product may suffer.

Since traditional troubleshooting methods may require manual intervention, the diagnostic tests often do not perform intrusive error checks which may require writing to the disk itself. Intrusive or destructive actions may not be authorized until the user takes the disk offline. Thus, the diagnostics may not run until after a catastrophic event has occurred, which is typically when a user decides or is forced to act on the disk(s).

SUMMARY

According to an exemplary embodiment of the present invention, a method of providing storage medium diagnostics comprises receiving an error message associated with a first data storage medium unit. A second data storage medium unit may be placed online. Data content may be copied from the first data storage medium unit to the second data storage medium unit. The first data storage medium unit may be placed offline from operation within a computing system while the second data storage medium unit is online. Diagnostics may be performed on the first data storage medium unit while the first data storage medium unit is offline.

According to another exemplary embodiment of the present invention, a computer program product for providing diagnostics in a computer storage medium with a plurality of data storage medium units, comprises a computer readable storage medium having computer readable program code embodied therewith. The computer readable program code may be configured to receive an error message associated with a first data storage medium unit; operate a second data storage medium unit as a clone of the first data storage medium unit in the computer storage medium; perform intrusive error checks on the first data storage medium unit while the second data storage medium unit is online in the computer storage medium; and determine whether the first data storage medium unit is identified as failed based on the intrusive error checks.

According to yet another embodiment of the present invention, a system comprises a processor, a read/write unit, and a computer storage medium including a plurality of data storage medium units. The computer storage medium may be coupled to the processor and the read/write unit. the processor may be configured to identify a first data storage medium unit being online in the system; receive an indication of one or more errors occurring in the first data storage medium unit; copy data content from the first data storage medium unit to a second data storage medium unit in the plurality of data storage medium units; automatically operate the second data storage medium unit without an interruption of operation of the system while the first data storage medium unit is placed offline within the system; perform diagnostics on the first data storage medium unit while the first data storage medium unit is offline; and determine whether the first data storage medium unit is identified as failed based on the performed diagnostics.

DETAILED DESCRIPTION

Figure 1:
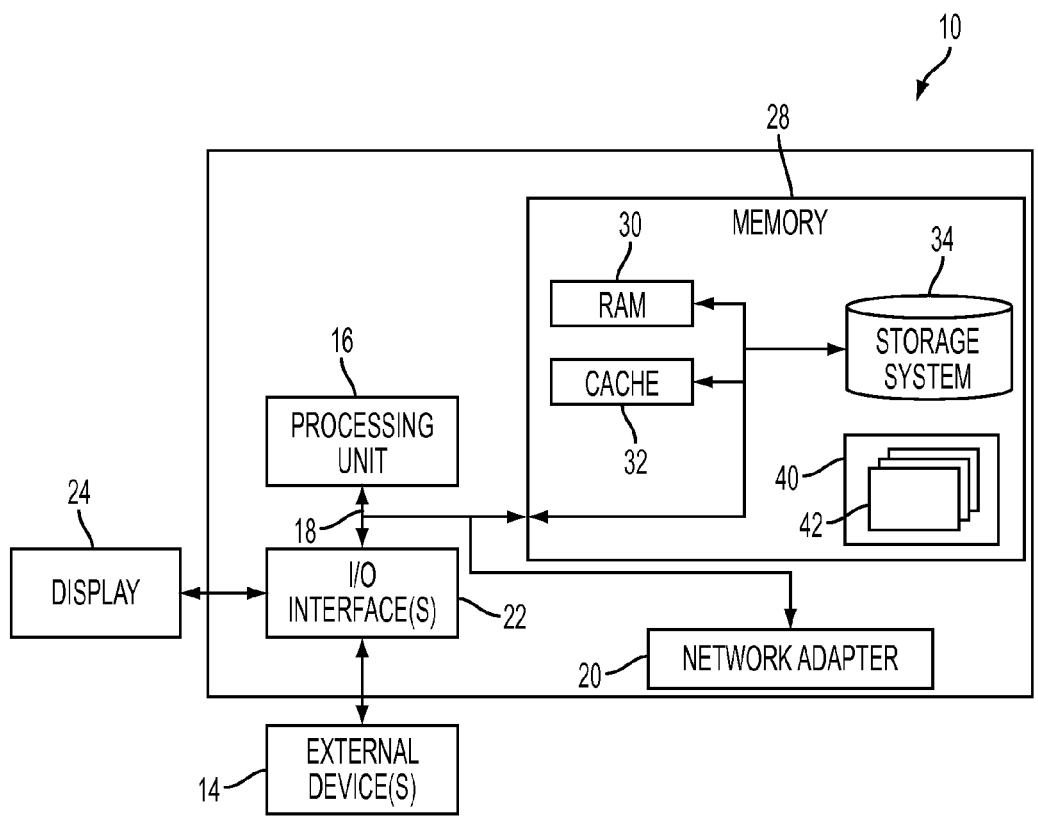
FIG. 1 depicts a computer system according to an embodiment of the present invention.

In general, embodiments of the subject disclosure provide an approach to operating a computer storage medium without taking a computing system offline to perform diagnostics on the computer storage medium. The computer storage medium may be moved between online and offline status while the computing system is maintained in an uninterrupted operational state. A second computer storage medium may be placed online in the computing system while the original computer storage medium is moved offline for diagnostic testing.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus may provide processes for implementing the functions/acts specified in the flowchart and/or block diagram block or blocks.

Referring now to FIG. 1, a schematic of a computing system 10 is shown. The computing system 10 illustrated is only one example of a suitable cloud computing node and is not intended to suggest any limitation as to the scope of use or functionality of embodiments of the invention described herein. Regardless, the computing system 10 is capable of being implemented and/or performing any of the functionality set forth herein.

The computing system 10 may be operational with numerous other general purpose or special purpose computing system environments or configurations. Examples of well-known computing systems, environments, and/or configurations that may be suitable for use as the computing system 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computing system 10 may be described in the general context of computer system executable instructions, such as program modules, being executed by a computer system. Generally, program modules may include routines, programs, objects, components, logic, data structures, and so on that perform particular tasks or implement particular abstract data types. The computing system 10 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computing system 10 is shown in the form of a general-purpose computing device. The components of the computing system 10 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computing system 10 may typically include a variety of computer system readable media. Such media could be chosen from any available media that is accessible by computing system 10, including volatile and non-volatile media, removable and non-removable media.

The system memory 28 could include one or more computer system readable media in the form of volatile memory, such as a random access memory (RAM) 30 and/or a cache memory 32. The computing system 10 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. The storage system 34 may also include other forms of storage media such as flash memory for example. In such instances, each computer system storage media may be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computing system 10 may also communicate with one or more external devices 14 such as a keyboard, a pointing device, a display 24, etc.; one or more devices that enable a user to interact with the computing system 10; and/or any devices (e.g., network card, modem, etc.) that enable the computing system 10 to communicate with one or more other computing devices. Such communication can occur via Input/Output (I/O) interfaces 22. Alternatively, the computing system 10 can communicate with one or more networks such as a local area network (LAN), a general wide area network (WAN), and/or a public network (e.g., the Internet) via a network adapter 20. As depicted, the network adapter 20 may communicate with the other components of the computing system 10 via the bus 18. It should be understood that although not shown, other hardware and/or software components could be used in conjunction with the computing system 10. Examples include, but are not limited to: microcode, device drivers, redundant processing units, external disk drive arrays, RAID systems, tape drives, and data archival storage systems, etc.

Figure 2:
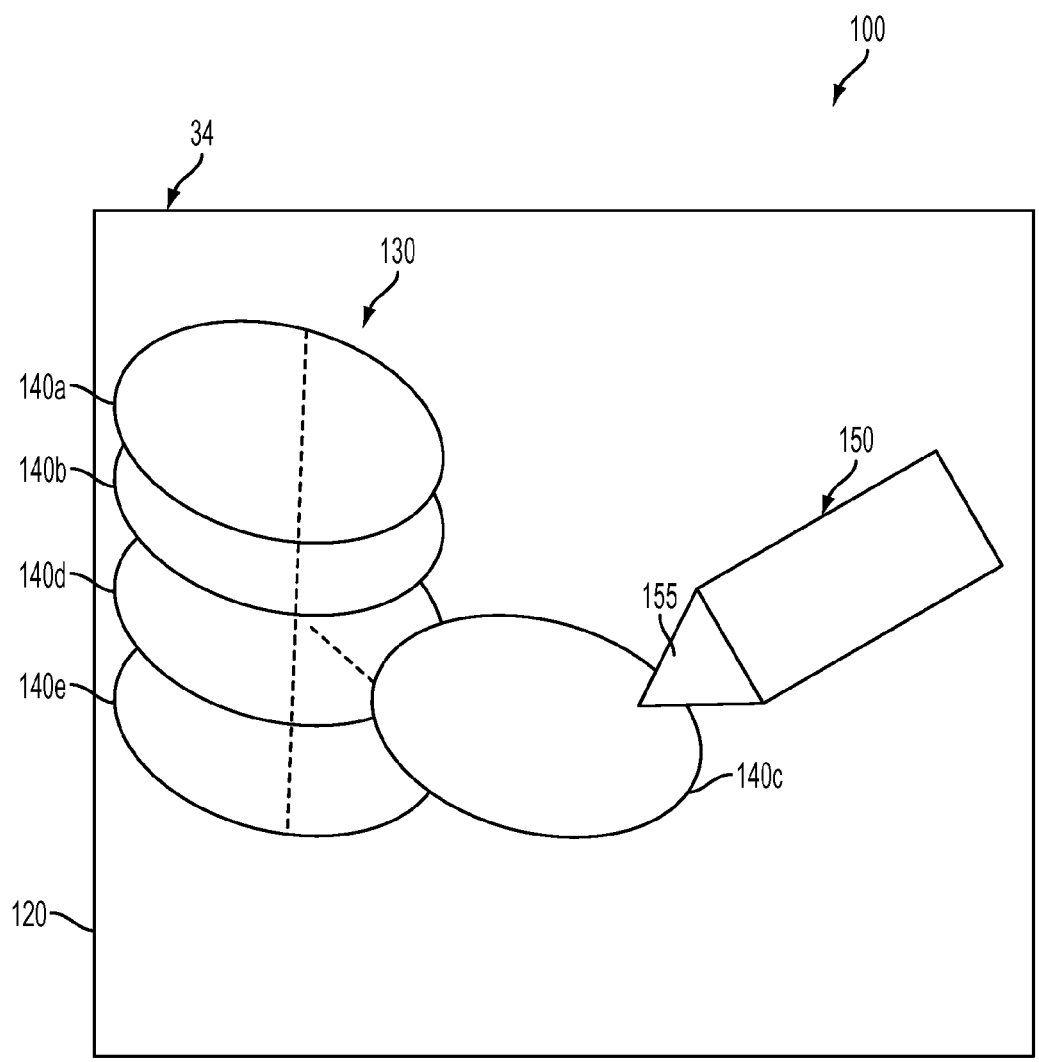
FIG. 2 depicts a product storage system according to an embodiment of the present invention.

Referring now to FIG. 2, a system 100 is shown according to an exemplary embodiment of the present invention. The system 100 may include the storage system 34 in operable connection with a read/write unit 150. The storage system 34 may house a group 130 of data storage medium units 140a, 140b, 140c, 140d, 140e (referred to in general as data storage medium unit(s) 140). While five data storage medium units 140 are shown, more or less units may be used. The group 130 may be contained within a housing 120. In an exemplary embodiment, the storage system 34 may be for example, a hard disk drive. The data storage medium unit(s) 140 may be disks. The group 130 may be stack of disks 140 (also sometimes referred to as platters). The read/write unit 150 may be disposed to read/write interact with one or more of the disks 140. While only a single read/write unit 150 is shown, it will be understood that multiple read/write heads 155 may be present to perform read/write actions on multiple disks 140.

While the description of FIG. 2 is shown in the context of a hard disk drive with sectors, it will be understood that other computer readable storage media may be operated according to the same principles disclosed. For example, hard disk drives with partitioned systems may also be operated according to the principles described in the subject disclosure. In other embodiments, it will be understood that the computer readable storage media employed may include technology that does not necessarily rely on spinning disks. For example, solid state devices, memory cards, and virtual memory type devices may be operated according to the same principles disclosed. In some embodiments, the storage system 34 may employ mixed heterogeneous or hybrid style computer readable storage media types. For example, the data storage medium unit 140a may be of a first type (e.g. a hard disk) while the data storage medium unit 140b may be of a second type (e.g. a solid state drive).

Additionally, for sake of illustration, some elements have been omitted from view that one may typically find within a storage system 34 including for example, electrical connections and mechanical connections.

As will be described in further detail below, the data storage medium unit(s) 140 may be moved in and out from online status within the computing system 10 (FIG. 1) such that the computing system 10 operates using (for example, reading and writing data content from) one of the data storage medium units 140 in a manner that allows other hardware and software applications to run when the data storage medium unit 140 is online. The group 130 may include one or more reserved data storage medium units 140 that may be offline while one or more of the data storage medium units 140 are online. When a data storage medium unit 140 is considered offline, then the computing system 10 may not necessarily use the data content on the data storage medium unit 140 to operate hardware or software. For example, the data storage medium unit 140c may be represented as being online by being shown as displaced from the group 130. However it will be understood that a data storage medium unit 140c does not necessarily have to be physically displaced from other data storage medium units 140 to be either online or offline as this is shown merely for sake of illustration. Thus, the data storage medium units 140a, 140b, 140d, and 140e may be either online or offline even though they are not shown as displaced from the group 130.

Figure 3:
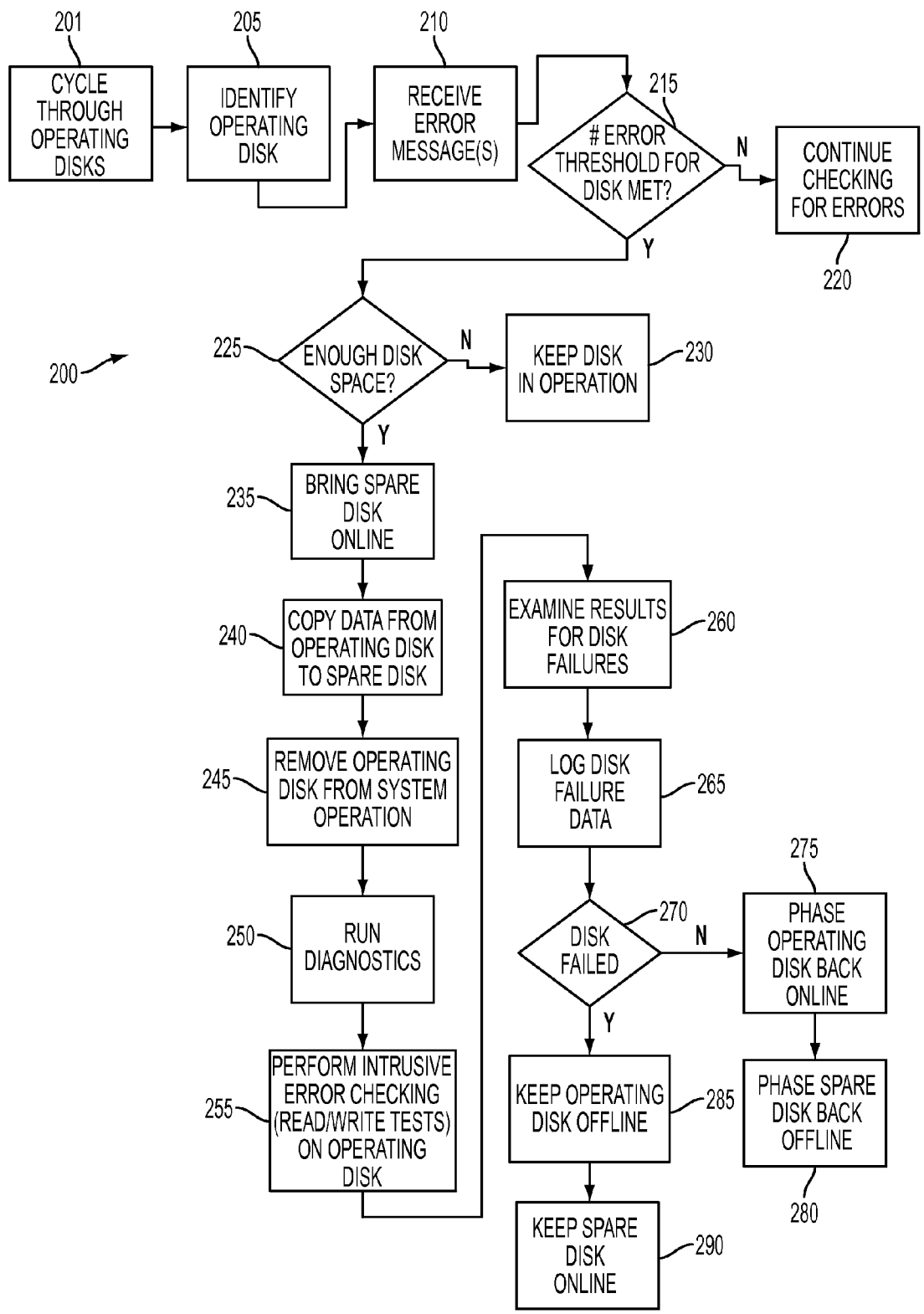
FIG. 3 depicts a method of providing storage medium diagnostics according to another embodiment of the present invention.

Referring now to FIG. 3 (with reference to elements of FIGS. 1 and 2), a method 200 of providing storage medium diagnostics is shown according to an exemplary embodiment of the present invention. The method 200 may include the processor 16 cycling (201) through each of the plurality of data storage medium units 140. The processor 16 may for example, cycle periodically through the data storage medium units 140 on an on-going basis to provide uninterrupted operation of the computing system 10. For sake of illustration, the following is described in the context of performing error checking by referencing two of the illustrated data storage medium units 140. However it will be understood that in some embodiments, the method 200 may be applied sequentially to each of the data storage medium units 140.

For example, the processor 16 may identify (205) one of the data storage medium units 140 operating online within the computing system 10. For example, this may be the data storage medium unit 140a. The processor 16 may receive (210) one or more error messages that are related to the operation of data storage medium unit 140a. The processor 16 may determine (215) whether a threshold number of errors from operation of data storage medium unit 140a have been received. In some embodiments, meeting the threshold number of errors may include counting only certain types or levels of errors. Errors considered by the processor 16 as potentially triggering a diagnostic process on the data storage medium unit 140a may include:

Sense Key 1 Error:

The Sense Key 1 error may indicate a 0x15 0x1 Mechanical Positioning error. This may be a transient condition. A threshold for the Sense Key 1 error may comprise a rate of occurrences. For example, over 3 Sense Key 1 error failures within a 65 minute window may satisfy the threshold determination.

Sense Key 3 Error:

The Sense Key 3 error may indicate a 0x11 0x0 Unrecovered Read error. The Sense Key 3 error may indicate a permanent condition hence a very low threshold may satisfy the threshold determination. For example, detecting 2 total errors may be enough to initiate diagnostics.

Sense Key 0xb Error:

The Sense Key 0xb error may indicate a 0x47 0x0 SCSI Parity Error. This generally is an indication of a serious hardware failure. Hence a single receipt of this type of error might trigger diagnostics.

The processor 16 may continue checking (220) for errors related to the data storage medium unit 140a if the threshold criteria are not met. However, when the threshold criteria are met, in some embodiments, the processor 16 may determine (225) whether the data storage medium unit 140 has a threshold amount of computer storage space available to perform diagnostic testing which may include for example intrusive error checking. Computer storage space may include for example sufficient disk sectors being available on a disk. When there is insufficient computer storage space, then the processor 16 may continue operating (230) the data storage medium unit 140a until, for example, enough computer storage space becomes available.

The processor 16 may enable (235) a second data storage medium unit 140, for example data storage medium unit 140c as being online. In some embodiments, the data storage medium unit 140c may be a dedicated spare unit unused during normal operation of the computing system 10 and brought online for diagnostic purposes. In some embodiments, the data storage medium unit 140c may be another data storage medium unit 140 that is typically online but includes enough computer storage space to operate in lieu of the data storage medium unit 140a. The processor 16 may copy (240) data content from the (operating) data storage medium unit 140a to the (spare) data storage medium unit 140c. For example, the data storage medium unit 140c may be cloned from the data storage medium unit 140a so that once the data content is copied over, the computing system 10 may transfer operation of hardware and software seamlessly under the data storage medium unit 140c.

The processor 16 may place (245) the data storage medium unit 140a offline. Thus the computing system 10 may temporarily refrain from accessing the data storage medium unit 140a for any hardware or software support. In an exemplary embodiment, the data storage medium unit 140a may be placed offline while the data storage medium unit 140c is online and the computing system 10 may continue to operate outside of the diagnostics performed under method 200.

The processor may perform (250) diagnostic testing on the data storage medium unit 140a. Diagnostic testing may include for example, searching for hardware and software errors on the data storage medium unit 140a. In some embodiments, diagnostic testing may include: identifying missing software patches or updates on the data storage medium unit 140a; validating the firmware level and updating if appropriate; reviewing log files; running diagnostics code embedded on the data storage medium unit 140a; reviewing temperature history; confirming the data storage medium unit 140a has not violated a manufacturing specification or user defined rules regarding temperature; and validating that related system components (such as fans) are working properly. The following table 1 shows an example of an identified symptom of errors (SCSI adapter problem) in the data storage medium unit 140a and potential actions run in response to the symptoms during diagnostic testing.

TABLE 1

| Symptom | Action |
| --- | --- |
| 1) A SCSI adapter problem. | 1) Run the online SCSI adapter diagnostic in problem determination mode. If a service request number is displayed, look up the SRN in the reference code finder and do the listed action. |
| 2) If the system was able to boot using a SCSI adapter, then Action 2). Use MAP 0050: SCSI bus problems. | 2) Use MAP 0050: SCSI bus problems. Note: If you cannot load diagnostics (stand-alone or online) go to MAP1540: Problem isolation procedures. |

For Symptom and Action 1), SCSI adapter diagnostics may typically be run on a SCSI adapter that was not used for booting. The power on self test (normally run when power is initially applied to a system or during a 'cold' reboot) may test any SCSI adapter before attempting to use it for booting. For Symptom and Action 2), SCSI adapter problems may also be logged into an error log and may be analyzed when the online SCSI diagnostics are run in problem determination mode. Problems may be reported if the number of errors is above defined thresholds. It may be appreciated that by being able to diagnose hardware/firmware issues offline while the computing system 10 remains in operation may save valuable debugging time. For example, if the hardware turns out to be satisfactorily running, locating the error sources by ruling out the firmware/hardware as the likely cause of the problem may narrow debugging down to resolving software issues.

In an exemplary embodiment, the processor 16 may perform (255) intrusive error checking on the data storage medium unit 140a. Intrusive error checking may include any actions that physically alter the data storage medium unit 140a to check that it is operating satisfactorily. For example, intrusive error checking may include performing read/write actions to the data storage medium unit 140a while it is offline. For example, the processor 16 may write to all data blocks on the data storage medium unit 140a and check for data corruption in any of the blocks. It may be appreciated that typically, operating the computing system 10 may not be possible when all of the blocks in the data storage medium unit 140a are being written to when the data storage medium unit 140a is online. However, by operating the computing system 10 with the cloned the data storage medium unit 140c, intrusive error checking of the data storage medium unit 140a becomes possible.

The processor 16 may examine (260) results of the diagnostic testing and/or the intrusive error checking for failures in the data storage medium unit 140*a*. The processor 16 may log (265) the results of data storage medium unit 140*a* failures onto another storage device. The processor 16 may determine (270) whether the data storage medium unit 140*a* is identified as having failed an operation based on the logged results of failures. In some embodiments, failure of the data storage medium unit 140*a* may depend on for example, the types of failures found or an amount of failures logged.

If the data storage medium unit 140*a* is not identified as having failed, the processor 16 may phase (275) the data storage medium unit 140*a* back online. In some embodiments, the data storage medium unit 140*a* may be updated with data content written to the data storage medium unit 140*c* while the data storage medium unit 140*a* was offline. When updated, the computing system 10 may resume interacting with the data storage medium unit 140*a*. The processor 16 may phase (280) the data storage medium unit 140*c* offline after the computing system 10 resumes interaction with the data storage medium unit 140*a*. Thus a seamless transition of operation between the data storage medium unit 140*a* and the data storage medium unit 140*c* with the computing system 10 may be achieved without interruption.

If the data storage medium unit 140*a* is identified as having failed, the processor 16 may maintain (285) the data storage medium unit 140*a* offline. In which case, the processor 16 may maintain (290) the data storage medium unit 140*c* online and may continue operating the computing system 10 without interruption.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of providing storage medium diagnostics, comprising:

receiving an error message associated with a first data storage medium unit;

determining whether a threshold number of error messages associated with the first data storage medium unit are received prior to placing a second data storage medium unit online;

placing the second data storage medium unit online;

copying data content from the first data storage medium unit to the second data storage medium unit;

placing the first data storage medium unit offline from operation within a computing system while the second data storage medium unit is online; and performing diagnostics on the first data storage medium unit while the first data storage medium unit is offline.

2. The method of claim 1, including performing read/write operations to the first storage medium unit while the first data storage medium unit is offline.

3. The method of claim 1, including:

determining results of the performed diagnostics; and determining that the first data storage medium unit is identified as failed based on the determined results.

4. The method of claim 3, maintaining the second data storage medium unit online when the first data storage medium unit is determined to be failed.

5. The method of claim 1, including:

determining results of the performed diagnostics;

determining that the first data storage medium unit is not failed based on the determined results; and placing the first data storage medium unit back online.

6. The method of claim 1, including determining whether there is a threshold amount of computer storage space available in the first data storage medium unit prior to placing the second data storage medium unit online.

7. A computer program product for providing diagnostics in a computer storage medium with a plurality of data storage medium units, the computer program product comprising a non-transitory computer readable storage medium having computer readable program code embodied therewith, the computer readable program code being configured to:

receive an error message associated with a first data storage medium unit;

operate a second data storage medium unit as a clone of the first data storage medium unit in the computer storage medium, where the computer-readable program code is configured to determine whether a threshold number of error messages associated with the first data storage medium unit is received prior to placing the second data storage medium unit online;

perform intrusive error checks on the first data storage medium unit while the second data storage medium unit is online in the computer storage medium; and determine whether the first data storage medium unit is identified as failed based on the intrusive error checks.

8. The computer program product of claim 7, wherein the computer-readable program code is configured to place the first data storage medium unit offline during the performance of intrusive error checks.

9. The computer program product of claim 7, wherein the intrusive error checks include read/write tests.

10. The computer program product of claim 9, where the computer-readable program code is configured to:
   log failures from the read/write tests on the first data storage medium unit; and
   determine whether the first data storage medium unit is identified as having failed based on types of failures or an amount of failures logged.

11. The computer program product of claim 7, where the computer-readable program code is configured to:
   cycle through the plurality of data storage medium units;
   perform the intrusive error checks on each of the plurality of computer storage medium units while offline and while at least one of the computer storage medium units is online.

12. The computer program product of claim 7, where the computer-readable program code is configured to:
   determine that the first data storage medium unit is not identified as having failed based on the intrusive error checks; and
   terminate operating the second data storage medium unit using the copied data.

13. A system, comprising:
   a processor;
   a read/write unit; and
   a computer storage medium including a plurality of data storage medium units, the computer storage medium being coupled to the processor and the read/write unit, wherein the processor is configured to:
   identify a first data storage medium unit being online in the system;
   receive an indication of one or more errors occurring in the first data storage medium unit;
   copy data content from the first data storage medium unit to a second data storage medium unit in the plurality of data storage medium units;
   automatically operate the second data storage medium unit without an interruption of operation of the system while the first data storage medium unit is placed offline within the system;
   perform diagnostics on the first data storage medium unit while the first data storage medium unit is offline; and
   determine whether the first data storage medium unit is identified as failed based on the performed diagnostics,
   wherein the processor is configured to:
   cycle through each of the plurality of data storage medium units;
   designate one at a time each of the plurality of data storage medium units as a data storage medium unit being error checked;
   designate another one of the plurality of data storage medium units as a clone of the data storage medium unit being error checked; and
   perform the diagnostics on the data storage medium unit being error checked.

14. The system of claim 13, wherein the cycling through each of the plurality of data storage medium units is performed on an on-going basis.

15. The system of claim 13, wherein the processor is configured to:
   determine that the first data storage medium unit is not identified as failed based on the performed diagnostics; and
   place the first data storage medium unit back online while moving the second data storage medium unit offline without interruption of the operation of the system.

16. The system of claim 15, wherein the processor is configured to update data content in the first data storage medium unit from data content in the second data storage medium unit prior to placing the first data storage medium unit back online.

17. The system of claim 13, wherein the computer storage medium is a hard disk drive and the plurality of data storage medium units are a plurality of disks.

* * * * *